(12) United States Patent
Hessler

(10) Patent No.: US 10,395,253 B2
(45) Date of Patent: Aug. 27, 2019

(54) SYSTEM AND METHOD FOR SECURING AND MONETIZING PEER-TO-PEER DIGITAL CONTENT

(71) Applicant: LiveEnsure, Inc., Westminster, CO (US)

(72) Inventor: Christian J. Hessler, Westminster, CO (US)

(73) Assignee: LiveEnsure, Inc., Westminster, CO (US)

( * ) Notice: Subject to any disclaimer, the term of this patent is extended or adjusted under 35 U.S.C. 154(b) by 360 days.

(21) Appl. No.: 15/403,444

(22) Filed: Jan. 11, 2017

(65) Prior Publication Data

US 2017/0124562 A1 May 4, 2017

Related U.S. Application Data

(63) Continuation-in-part of application No. 15/199,191, filed on Jun. 30, 2016, now Pat. No. 10,140,600.

(Continued)

(51) Int. Cl.

| | |
|---|---|
| *G06Q 20/40* | (2012.01) |
| *G06Q 20/22* | (2012.01) |
| *G06Q 20/08* | (2012.01) |
| *G06F 21/10* | (2013.01) |
| *G06F 21/31* | (2013.01) |

(Continued)

(52) U.S. Cl.
CPC ........... *G06Q 20/405* (2013.01); *G06F 21/10* (2013.01); *G06F 21/105* (2013.01); *G06F 21/31* (2013.01); *G06F 21/316* (2013.01); *G06Q 20/0855* (2013.01); *G06Q 20/123* (2013.01); *G06Q 20/223* (2013.01); *G06Q 20/382* (2013.01); *H04W 12/06* (2013.01); *G06F 2221/0759* (2013.01); *G06F 2221/0788* (2013.01); *H04W 12/00503* (2019.01); *H04W 12/00504* (2019.01); *H04W 12/00508* (2019.01)

(58) Field of Classification Search
None
See application file for complete search history.

(56) References Cited

U.S. PATENT DOCUMENTS

| | | | |
|---|---|---|---|
| 7,003,117 | B2 | 2/2006 | Kacker et al. |
| 7,848,980 | B2 | 12/2010 | Carlson |

(Continued)

FOREIGN PATENT DOCUMENTS

EP 2887246 6/2015

*Primary Examiner* — William J. Goodchild
(74) *Attorney, Agent, or Firm* — Susan L. McCain; Hankin Patent Law, APC; Kevin Schraven

(57) ABSTRACT

A system and method to select, secure, and monetize shared digital content by authenticating peers across digital networks and platforms, and independently controlling and monetizing access to said shared digital content with others across the same platforms from their mobile devices. Authors may privately control and authorize user mobile access to shared digital content according to device, location, behavior, time and knowledge authentication contexts and independently secure and monetize said content with one or more of those peers in real-time across any messaging or communication network, either by value or by reference. Recipients may perform required authentication and may execute required P2P payments to sender to gain access to said shared digital content on their mobile device.

11 Claims, 5 Drawing Sheets

Related U.S. Application Data

(60) Provisional application No. 62/278,631, filed on Jan. 14, 2016, provisional application No. 62/187,462, filed on Jul. 1, 2015.

(51) Int. Cl.
*H04W 12/06* (2009.01)
*G06Q 20/12* (2012.01)
*G06Q 20/38* (2012.01)
*H04W 12/00* (2009.01)

(56) References Cited

U.S. PATENT DOCUMENTS

| | | | |
|---|---|---|---|
| 7,974,234 B2 | 7/2011 | Gustave et al. | |
| 8,369,828 B2 | 2/2013 | Hamzeh | |
| 8,423,409 B2 | 4/2013 | Rao | |
| 8,428,453 B1 | 4/2013 | Spiegel et al. | |
| 8,589,236 B2 | 11/2013 | Afana | |
| 8,892,461 B2 | 11/2014 | Lau et al. | |
| 8,904,480 B2 | 12/2014 | Castro et al. | |
| 8,909,725 B1 | 12/2014 | Sehn | |
| 9,100,222 B2 | 8/2015 | Sarmah et al. | |
| 9,112,936 B1 | 8/2015 | Poletto et al. | |
| 9,237,202 B1 | 1/2016 | Sehn | |
| 9,251,370 B2 | 2/2016 | Kowalik et al. | |
| 9,294,485 B2 | 3/2016 | Allain et al. | |
| 2004/0181487 A1* | 9/2004 | Hanson | G06F 21/10 705/52 |
| 2006/0218651 A1* | 9/2006 | Ginter | G06F 21/00 726/27 |
| 2009/0132341 A1 | 5/2009 | Klinger et al. | |
| 2012/0110661 A1* | 5/2012 | Tverskoy | A61B 5/0002 726/16 |
| 2012/0116957 A1* | 5/2012 | Zanzot | G06Q 20/10 705/39 |
| 2013/0133045 A1* | 5/2013 | Hayes | H04L 63/08 726/5 |
| 2014/0129953 A1 | 5/2014 | Spiegel | |
| 2014/0201848 A1* | 7/2014 | Kulkarni | G06F 21/6218 726/27 |
| 2015/0082391 A1 | 3/2015 | Lerman | |
| 2015/0332365 A1* | 11/2015 | Kassemi | H04L 51/38 705/26.41 |

\* cited by examiner

SYSTEM AND METHOD FOR SECURING AND MONETIZING PEER-TO-PEER DIGITAL CONTENT

CROSS-REFERENCE PARAGRAPH

This Application claims priority to, and the benefit of, U.S. Provisional Patent Application No. 62/278,631, filed on Jan. 14, 2016, titled "A System and Method for Securing and Monetizing Peer-To-Peer Digital Content", by inventor Christian J. Hessler, the contents of which are expressly incorporated herein by this reference as though set forth in their entirety. This Application is also a continuation in part to U.S. Non-Provisional patent application Ser. No. 15/199,191, filed on Jun. 30, 2016, titled "System and Method for Mobile Peer Authentication and Asset Control", by inventor Christian J. Hessler, the contents of which are expressly incorporated herein by this reference as though set forth in their entirety, and to which priority is claimed. U.S. Non-Provisional patent application Ser. No. 15/199,191 claims the benefit of both U.S. Provisional Patent Application No. 62/278,631, filed on Jan. 14, 2016, titled "A System and Method for Securing and Monetizing Peer-to-Peer Digital Content", and U.S. Provisional Patent Application No. 62/187,462, filed on Jul. 1, 2015, titled "A System and Method for Peer Asset Authentication", both by inventor Christian J. Hessler, the contents of both are expressly incorporated herein by this reference as though set forth in its entirety, and to which priority is claimed.

FIELD

The present disclosure generally relates to a system and method for providing a network security, authentication, and payment context for sharing, monetization, and consumption of digital content among peer end users on mobile devices across, but independent of, existing, public social, storage, and messaging channels with respect to authentication security, peer payments, and transaction or storage fees. In particular, this disclosure relates to authentication security and peer-to-peer payment systems and methods using a mobile electronic computing device across a network using contextual and payment factors within a defined session to identify and authenticate users, secure and monetize shared digital assets, and authorize synchronous or asynchronous access to said assets, shared and consumed by reference or value.

BACKGROUND

Historically, the area of end-user, peer-to-peer (P2P) social or digital content control revolved around reliance on interim social or storage platform rules or techniques limited to the particular network's identity-specific, bespoke offerings such as Dropbox® permissions, Snapchat® ephemeral behaviors, Facebook® filters and the like. In addition, mobile peer-to-peer payment solutions like Facebook® Messenger pay, Venmo®, Square®, or Stripe®, primarily involve sending money independently from one user to another by identity or handle for no related value transaction or simply paying for prescribed or pre-configured products and services, such as in an online store, auction site or shopping cart button. Traditional content monetization sites or platforms, such as, for example, eBay®, Amazon®, iTunes®, CDBaby®, TuneCore®, Hulu®, YouTube®, and Netflix® only offer sellers long lead-times to author, ingest, and monetize fixed types of content over their channel with equally long and discounted repayment cycles. Traditional storage platforms like Dropbox®, Box®, SkyDrive®, OneDrive® and iCloud® require content to be stored on their servers in order to be protected and do not offer granular tools to secure the content and authenticate user access irrespective of their location. Specific protected document or file solutions that do not rely on interim storage require pre-arranged identities, digital certificates, and modification of the source files to instrument the granular control. They also tend to be enterprise-focused in both administration, deployment and operation, assuming a centralized control pattern and management with pre-arranged instrumentation of mobile user device end points. None of these focus on the "crowd" or provide a way to monetize the content shared or hosted that mirror how dynamically and cross-channel contemporary social media and messaging work on mobile.

The issue with all of these approaches is they do not provide users with the flexibility to secure "any" content with "anyone", regardless of the temporal user ID, network, channel, or platform, and the payment mechanisms to immediately and interactively monetize content where the seller is paid directly, P2P, with heavy fees or discounted remuneration. None of these traditional mechanisms to share, control, and monetize digital content or assets reflect the immediacy and flexibility of social media, the P2P exchange of social interaction, the ability to monetize self-authored content in real-time (such as photos, files, music, videos, messages or information/data) with peers, or the cross-platform reality of multi-channel communication and commerce. Current systems are all leveraged toward the "cloud" not the "crowd" with respect to the form, function, favor, and features of social content control, monetization and the lack thereof. Before the present system, authenticating user access to shared content generally involved users authenticating against factors or secrets to gain access to a device or cloud/website/app-based resource. All such security assertions emanated from and were authored and controlled by the hosting site or application, be it a website, cloud storage, game, media content, social media platform, chat, or messaging platform. Despite end users sharing content over said sites, apps and networks, the security was hosted and controlled by the central site, acting as a hub and spoke. P2P trust and security, as defined as authored and controlled by the peers, as opposed to by a central website or asset/resource host, has thus remained elusive. Users could only establish trust of the other peer user(s) or enforce access to their shared content through permissions and mechanisms both unique to (isolated) and under the guise of the central site or app platform or network. Ephemeral systems such as SnapChat® and Vera® only increase the complexity of managing such assets in a prescriptive way and still retain control over the ephemeral asset qualities without hints of personal control, real-time influence, and, of course, immediate monetization capabilities.

This current state of the art has left an empty hole with respect to P2P social content security, control, and monetization of digital assets and information the users share between or among third party sites, apps and networks. In addition, user-authored tools and techniques to construct, apply, and enforce said security and monetize amongst their assets and peers has been wholly absent from the prior solution due to four primary reasons. First, the hosting sites, apps, and networks hold a commercial interest in maintaining sole control over the end user security, identity, privacy (or lack thereof), and payments in so much that it serves their commercial purposes and competitive advantage. Second, these site, app, and network security tools are typically limited to the platform in question and generally do not transcend particular platforms or channels, as end users do themselves during the normal course of their digital lifecycle. Third, such walled-garden authentication and monetization tools serve primarily to verify the end user/customer to the site, thereby causing the site to proxy that trust to other users and other content without distinct and individual user control, configuration management, application, obfuscation, and/or repudiation of said credentials and contexts. Fourth, the platforms that do allow content monetization only do so for largely prescriptive content that has been ingested ahead of time and shared en-masse in a store, shopping cart, or broadcast fashion without respect to immediate authoring or sharing and individual controls. In addition, these platforms charge a considerable fee (upwards of 30-40%) for hosting and selling the prescriptive digital content (like images, songs, videos, books, files) in which they the platform collect the fees and only remit back to the seller, periodically, the discounted and often accumulated remainder. Before the present system there were no real-time, P2P content authoring and sharing, monetization and remuneration solutions for the "crowd" on mobile devices.

The first challenge is to design a system where users can simply and easily share, control, and monetize digital content from their mobile device over any platform, channel, or network. Outside of the often patronized channel or platform, the user must be able to triangulate and impose their own security and financial requirements and rigor to validate the recipient against who they are, where they are, what device they are one, when they are, what they have or do, what they must pay and what they know or can demonstrate, or a combined context of all of the above, against fixed or dynamic thresholds. They must be able to do this mutually, synchronously, asynchronously, and across disparate networks, platforms, devices and contexts.

The second challenge is to design a system where users can independently control the content they share with other users across any device, network, or platform, regardless of the content asset type, location, duplication, transmission or format, and regardless of its ownership or hosting status—in terms of content by reference (a link) or by value (an attachment). Current authentication measures generally cover control of the content at the vendor level in bespoke or proprietary walled gardens, such as Facebook®, Box®, Dropbox®, or other custom silos where rules are enforced at the point of local access, according to those platform's rules. Despite owning the content being hosted or shared, users are able to only manipulate those rules and monitor the enforcement, rather than, authoring or controlling them irrespective of the hosting platform or network.

The third challenge is to design a system where users can ideally merge the concepts of user authentication and share or asset authentication/control into a single, combined, contextual event. No share or asset is considered independent (and therefore accessible) outside of the event of access by a user or users in a particular context. In short, assets should be protected in contextual motion (during access) rather than at static rest. Balancing security in favor of this user+share authentication context generally increases protection and customization while reducing persistence and predictability, along with a host of other techniques that sidestep the liabilities, cost, complexity, lack of scalability, risk and management of traditional multi-factor or file encryption methods.

The fourth challenge is to design a system that preferably contextualizes all possible security factors into a dynamic, dependent, and interactive context as opposed to mere validation of static stored, linear or sequential credentials. The ideal trust context would preferably comprise a) one or more devices and their unique properties, presence and performance, b) location and proximity measurements according to individual or composite perspectives of the sender, recipient, device, and server, c) the voluntary or in voluntary behavior of the user and their device or devices, such as touch, gesture, motion, orientation, biometrics, sound, vision, etc., d) the time-limited access to any share by any user, and e) knowledge or secret data information whether challenged and responded, shared, self-authentication for derived/algorithmic. Any combination or isolation of these factors, in a particular context, would be required to simultaneously and interdependently authenticate the share asset and recipient access together.

The fifth challenge it to design a system that preferably maintains the end user privacy and utmost control (at a P2P level) through all of these mechanisms, offering ultimate freedom to trust, share and secure the peers and content without fear of hacks, compromise, privacy invasion, or reprisal. By creating an intelligent system of access, denial, assertion and even misdirection, the sender, receiver, and assets would remain secure and private, both physically and cognitively. It also requires systemic protection from privacy exposure with commensurate assurances the security in question is offline from the asset and platform in terms of independence and anonymity.

The sixth challenge is to provide a seamlessly integrated mobile method to monetize the sharing and control of digital content on a P2P basis where the fees and requirements are set solely by the sender, payments are remitted directly back to the sender from the recipient without interference or burdensome charges from the platform acting as a proxy, store, or "layer". In addition, the payment mechanisms must be immediate to allow sender near real-time access to their funds and reduce costs for both the sender and recipient thus supporting a more valuable and equitable transaction. Ideally, the P2P monetization model must support both one-time and recurring (or subscription-based) payments whose validation defines initial and subsequent share access by recipients either locally or across a network. The payment mechanism must slipstream into existing sender/recipient social or e-commerce payment mechanisms already found on their mobile device and integrate with an existing social and digital e-commerce lifestyle.

Current peer authentication measures fail to offer a solution to the above challenges without the following traditional pitfalls, including: a) relying on stored value tokens, cookies or certificates (PGP—pretty-good-privacy) to pre-bake user endpoints and devices as trusted participants; b) reliance on third-party transmission of out-of-band or one-time passwords or tokens; c) naive federation of trust among different vendor systems outside the user control, thus offering a single point of repeatable failure; d) a cumbersome local storage of keys and encryption tools to simply "obfuscate" the validation or protection in terms of mathematical indirection versus true, derived and universally unique authentication; e) complete obviation of cross-context user control over their security, trust, content and privacy in deference to the moonlighting or federated hosting site, server or issued credentials; f) lack of independent user or peer authorship, participation, and ownership of the security process; and g) lack of capabilities to support user or peer maintenance or enforcement of their own privacy and integrity across disparate communication channels and platforms.

Examples of limited or deficient systems with respect to mobile peer authentication include U.S. Pat. No. 7,974,234 for a method of authenticating a mobile network node in establishing a peer-to-peer secure context between a pair of communicating mobile network nodes; U.S. Pat. No. 9,100,222, for a system and method for mobile user authentication; and U.S. Pat. No. 8,892,461 for a mobile device user behavior analysis and authentication.

Current content authoring, peer-sharing/control and messaging privacy measures fall into one of three trite types: per-user access controls; per-asset encryption; or ephemeral asset behavior. There is typically a) an unfortunate requirement for hosting of said shared content on a specific platform, b) reliance on particular endpoint identities to enforce content control, encryption or payment, c) proxied peer payments resulting in long lead times, large commissions and delayed remittance, d) system or platform limited rules for content control, ephemeral behavior or real-time control enforcement, e) inability to truly authenticate the recipient accessing or consuming the content and f) a lack of support for both synchronous or asynchronous processing of authentication, payment and asset control.

Examples of this failed or limited current systems with respect to content control and messaging privacy are demonstrated by U.S. Pat. No. 9,112,936 for systems and methods for ephemeral eventing and U.S. Pat. No. 8,909,725 for content delivery network for ephemeral objects, and U.S. Published Patent Application No. 2015/0082391 for secure messaging.

Current social or peer payment prior art are limited to specific social or payment networks, sending funds directly for no associated purpose, motivation or restriction. Current traditional e-commerce marketplace and payment prior art are limited to specific content types and require pre-arranged content preparation, approval and hosting or streaming, such as Amazon®, iTunes®, CDBaby®, TuneCore®, Hulu®, YouTube®, eBay®, Netflix®, Spotify®, etc. They are limited to specific types of content or streams for sale or subscription at a specific offering point (store, auction, stream, cart, site or in-app purchase) and are subject to considerable platform fees and restrictions. The seller/sender has no control over the flexibility of content, price, platform, placement and payment. The entire authoring, ingest, tagging, share, sell, and remittance process in these traditional systems do not reflect the immediacy, personalization and omni-channel flexibility of social media.

Examples of the failed or limited systems with respect to social or mobile payments between peers are shown in U.S. Pat. No. 8,369,828 for Mobile-to-mobile payment system and method; U.S. Pat. No. 7,848,980 for mobile payment system and method using alias; and U.S. Pat. No. 8,589,236 for Mobile payment station system and method.

Thus, based on the foregoing, what is needed is a simple, secure, and distributed mobile, peer-based asset authentication and monetization system and method that overcomes the deficiencies in the systems that are currently available. The present method and system of this disclosure solves these deficiencies and generally represents a new and useful innovation in the space of independent and interactive P2P access authentication, digital content control and P2P monetization across all networks, platforms and devices that favors the crowd over the cloud.

SUMMARY

To minimize the limitations in the prior art, and to minimize other limitations that will become apparent upon reading and understanding the present specification, the present disclosure may be a new and useful peer-to-peer mobile digital content control, monetization, and sharing system and method.

The present system and method provides an innovative, applicable, and practical way for peer mobile users to independently authenticate each other, share, control, and monetize their own digital content from mobile device to mobile devices across public messaging networks and social or storage platforms. Secondly, the present system and method may offer an innovative and interactive extension to an assertion of trust so as to control and monetize any content shared by his/her peers across homogenous or heterogeneous platforms or channels, without permission, custody, reliance upon, or fees paid to the interim platforms or channels and/or to the underlying identity, platform identity, security, or commerce mechanisms.

One embodiment may be a computer-implemented method for peer digital asset sharing, control, and monetization, the steps comprising: providing a server and some digital content; prompting a user to select or author the shared digital content on a first mobile device; selecting one or more recipient security factors; selecting one or more recipient peer payment factors; sending the one or more shared digital content, recipient security factors and recipient payment factors from the first mobile computing device to the server; sending a secured share link back to the first mobile device; prompting the user to send the share link and an asset to a second mobile computing device of a recipient; prompting the recipient to access the share link sending one or more recipient user credentials to the server; processing the share and the one or more recipient security and payment factors by the server and the recipient; and providing an unsecured asset link to the second mobile device. The steps may further comprise: selecting one or more recipient authentication requirements; wherein the one or more recipient security factors comprises a device of the recipient device; wherein the one or more recipient security factors comprises a location of the recipient; wherein the one or more recipient security factors comprises the timing or expiration of the share; wherein the one or more recipient security factors comprises a behavior of the recipient; and wherein the one or more recipient security factors comprises a knowledge of the recipient; wherein the one or more payment security factors comprises an amount, a currency, P2P payment method and a remittance method of the share, sender and recipient preference.

Another embodiment may be a computer based method for securing and monetizing peer-to-peer digital content, comprising the steps: providing a server, the server comprises a server securitization and monetization application; providing a sender device and a recipient device, each of which comprises a device securitization and monetization application that are controlled by and are configured to communicate with the server securitization and monetization application; prompting a sender to select a share using the sender device; prompting the sender to select one or more authentication factors to associate with the share; creating a secured share, the secured share references but obfuscates the share and requires fulfillment of the one or more authentication factors in order for at least one recipient to access the share (the creating step may be done by the application on the server (as preferred), or may be done by the local sending device, or may be done by selecting by reference and configuring share parameters); returning the secured share to the sender device; sending the secured share to the at least one recipient; prompting the at least one recipient to preview the secure share on the recipient device; processing the at least one recipient's attempt to fulfill the one or more authentication factors; determining by the server whether the one or more authentication factors were successfully fulfilled by the at least one recipient; providing access to the share to the recipient device for consumption by the at least one recipient if the one or more authentication factors were successfully fulfilled by the at least one recipient; denying access to the share if the one or more authentication factors were not successfully fulfilled. At least one of the one or more authentication factors may be selected from the group of authentication factor categories consisting of: location; behavior; time; knowledge; and/or payment. The at least one of the one or more authentication may be a peer payment. The peer payment may be reoccurring. The method may further comprise the step: prompting the sender to select one or more options to associate with the share. There may be two or more recipients, wherein at least one of the one or more options selected is synchronicity, such that the two or more recipients may attempt to fulfill the one or more authentication factors in synch. At least one of the one or more options selected is a notification and the method may further comprise the step of notifying the sender by the server whether the one or more authentication factors were successfully fulfilled by the at least one recipient. The notification may be done before access is provided or denied. The method may further comprise the steps: processing by the server whether the notified sender overrides either successful fulfillment or unsuccessful fulfillment of the one or more authentication factors; wherein the secured share is sent via one or more third party networks; wherein if the one or more authentication factors were successfully fulfilled, the share never resides on one or more servers of the one or more third party networks; wherein if access is denied by the server, the server may provide a ruse share to the unsuccessful recipient. The ruse share may be sent instead of a denied message.

Another embodiment may be a computer based method for securing and monetizing peer-to-peer digital content, comprising the steps: providing a server, the server comprises a securitization and monetization application; providing a sender device and a recipient device, each of which are in communication with the securitization and monetization application; prompting the sender to select a share using the sender device; prompting the sender to select one or more authentication factors to associate with the share; prompting the sender to require a peer payment from at least one recipient; creating a secured share, the secured share references but obfuscates the share and requires fulfillment of the one or more authentication factors in order for the at least one recipient to access the share (the creating step may be done by the application on the server (as preferred), or may be done by the local sending device, or may be done by selecting by reference and configuring share parameters); returning the secured share to the sender device; sending the secured share to the at least one recipient; prompting the at least one recipient to preview the secure share on the recipient device; processing the at least one recipient's attempt to fulfill the one or more authentication factors (the sending may be done automatically or enabled manually, if manually, the device may deny or enforce with the server preferably enabling in the background); processing the at least one recipient's tendering of the peer payment; determining whether the one or more authentication factors were successfully fulfilled by the at least one recipient; determining whether the peer payment was successfully fulfilled by the at least one recipient; providing access to the share to the recipient device for consumption by the at least one recipient if the one or more authentication factors and the peer payment were successfully fulfilled by the at least one recipient; denying access to the share if the one or more authentication factors were not successfully fulfilled or if the peer payment was not successfully fulfilled. At least one of the one or more authentication factors may be selected from the group of authentication factor categories consisting of: location; behavior; time; and/or knowledge. The peer payment may be reoccurring. The method may further comprise the steps: prompting the sender to select one or more options to associate with the share; wherein the at least one recipient is two or more recipients; wherein at least one of the one or more options selected is synchronicity, such that the two or more recipients must attempt to fulfill the one or more authentication factors in synch. The method may further comprise the steps: prompting the sender to select one or more options to associate with the share; wherein at least one of the one or more options selected is a notification; notifying the sender by the server whether the one or more authentication factors were successfully fulfilled by the at least one recipient; processing by the server whether the notified sender overrides either successful fulfillment or unsuccessful fulfillment of the one or more authentication factors. The secured share may be sent via one or more third party networks, such as a social network and wherein the share never resides on one or more servers of the one or more third party networks, regardless as to whether access is granted or denied. If access is denied by the server, the server may provide a ruse share to the unsuccessful recipient. The ruse share may be sent instead of a denied message.

The present system and method may provide independent contextual trust, control and personal commercialization of digital content between and among peers on the Internet and within mobile interactions.

The present system and method may provide private, independent, and interactive control over content any shared with and among peers over mobile and Internet networks without permission of or reliance upon the underlying networks, channels, or platforms.

The present system and method may allow senders to simply author, browse to, or cut and paste any content, file, link, reference, or digital asset the sender wishes to securely share from their mobile by reference or value from without the sources of those shares and asset repositories.

The present system and method may provide senders simple taps to choose powerful security, monetization, and authentication verification and control over other users and shares from among device, wearable, location, behavior, time, biometric, knowledge, and P2P payment options.

The present system and method may allow the sender to choose time, frequency, notification, and substitution options to further control and privatize the content that the sender shares.

The present system and method may allow the sender to choose the amount, currency, and frequency or period of P2P payment between recipient and sender as options to further control and monetize the content that they share.

The present system and method may transform the share parameters into a secured link or asset for sharing back out by the sender with all share parameters, sender identity, payments, and share content obfuscated and/or protected from illegal or unauthorized access, interim platform copy/storage/archiving, and/or exposure.

The present system and method may allow senders to simply paste back into any social, network, or messaging platform the newly secured share for ease of transmission.

The present system and method may provide a secured link that may be engaged by a recipient, valid or invalid, such that the secured link will be met with equal authentication prosecution and payment validation according to the factors configured to that share and to that user.

The present system and method may provide the recipient of the share with an optional preview to the secured or monetized content before engagement, authorization, purchase, and/or consumption.

The present system and method may provide an authentication method that allows valid recipients who can authenticate will seamlessly access the desired content.

The present system and method may deny access to the desired content or be provided with a noxious substitute asset as a misdirection, to an invalid recipient who failed to authenticate or pay or be current with periodic payments.

The present system and method may allow the recipient to be permitted both local and/or network access to the original and authorized shared content, unless or until that authorization, payment status, context authenticity, or other verification is no longer valid.

The present system and method may allow the original sender of the share to be optionally notified of the recipient access attempt and the status of that attempt.

The present system and method may allow the recipient to also be optionally given real-time notification and decision power over a recipient share access attempt, either pass for fail, with overriding or canceling permission control.

The present system and method may allow the validation, access control and payment, payment validation, notification, and permission management to occur at a P2P level without interim platform or channel awareness, interaction, filtering, control, archiving, or interference.

The present system and method may allow the sharing and validation among peers to be permissible at a one to one, one to many, or many-to-many levels, with both synchronous, asynchronous, and mutual variations supported.

The present system and method may allow both senders and recipients to be on the same or different device types, networks, or platforms.

The present system and method may allow both senders and recipients to remain anonymous and abstracted from the share context authentication in terms of identity, history, or participation.

The present system and method may allow the shared content to cross mediums such as email, SMS, social post, chat window, HTML link, and/or instant message, with the security, trust, privacy, and control remaining intact.

The present system and method may allow the concept of security and authenticity at a peer level to be synonymous with the user and the share as a single context versus a serialized, sequential, or separated/isolated approach.

The present system and method may allow all contextual authentication to be bespoke, interactive, and real-time without relying stored factors such as tokens, cookies, passwords, dongles, OOB/OTP values, SSOs, digital certificates, PGP, browser profiles, key stores, transmitted key-value pairs, password lockers, PUF technology, and/or involuntary biometrics.

The present system and method may be simple, mobile, and globally scalable with simple language-agnostic tap engagement, cut and paste interaction, and no plugins, APIs, programming, or platform-specific configuration required.

The present system and method may allow peers to monetize their content independent of interim channels, platforms, or restrictions with payments for access to the content to be paid by the recipient directly to the sender via one or more native or 3rd party peer mobile payment mechanisms, per the discretion of the both the sender and recipient.

The present system and method may allow peers to monetize their content independent of interim channels, platforms, or restrictions and without additional fees, levies, duties, or taxes to transmit or share content over their network outside of the nominal fees charged by the payment gateways themselves.

The present system and method may allow peers to monetize their content via single-use or recurring (subscription) payment factors for initial and/or subsequent share authorization and access, either locally or across a network.

The present system and method to provide a new, novel system and method that offers a superior solution in the field, science, and area of electronic authentication.

It is an object of the present system and method to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION

Figure 1:
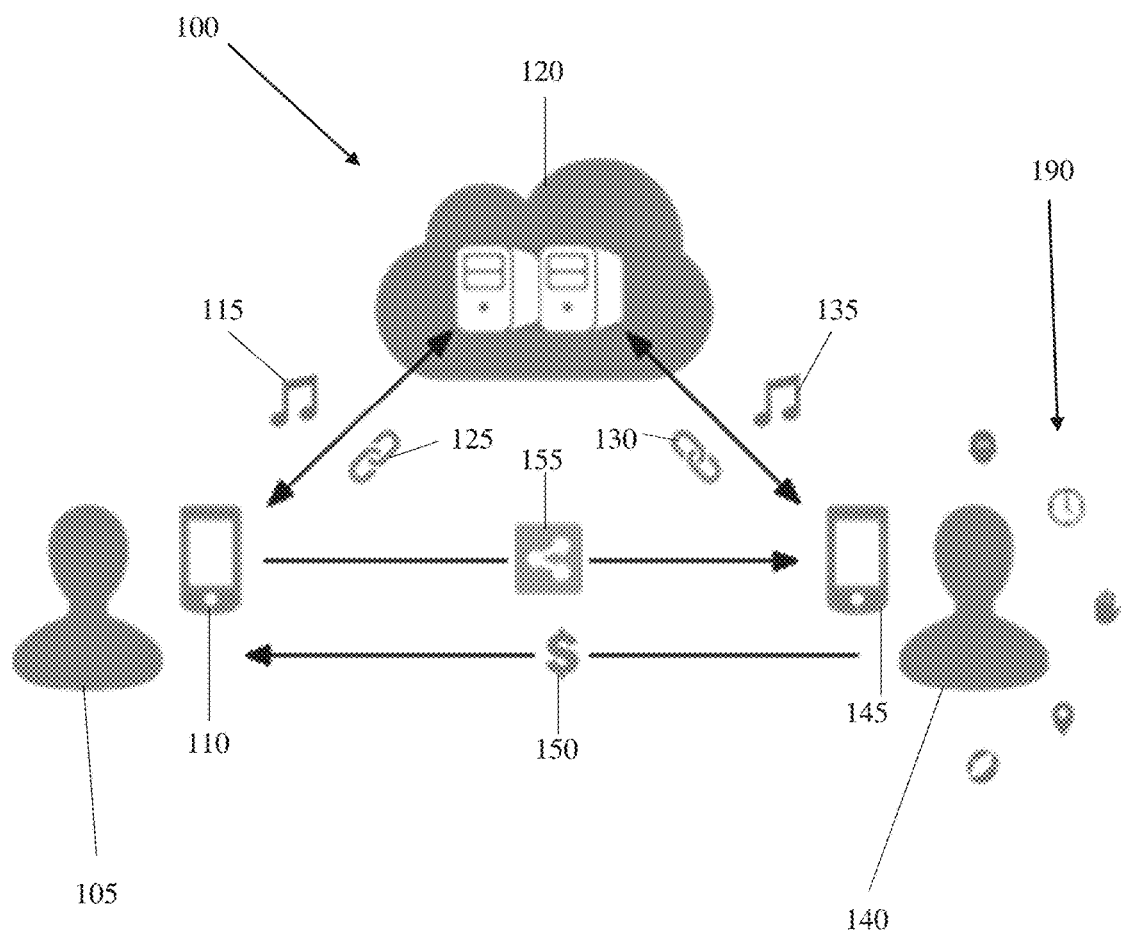
FIG. 1 is a system diagram of one embodiment of the computer-based method for securing and/or monetizing peer-to-peer digital content.

In the following detailed description of various embodiments, numerous specific details are set forth in order to provide a thorough understanding of various aspects of one or more embodiments. However, these embodiments may be practiced without some or all of these specific details. In other instances, well-known methods, procedures, and/or components have not been described in detail so as not to unnecessarily obscure aspects of embodiments of the present disclosure.

While multiple embodiments are disclosed, other embodiments will become apparent to those skilled in the art from the following detailed description, which shows and describes illustrative embodiments. As will be realized, the system and method described herein is capable of modifications in various obvious aspects, all without departing from the spirit and scope of protection. Accordingly, the graphs, figures, and the detailed descriptions thereof, are to be regarded as illustrative in nature and not restrictive. Also, the reference or non-reference to a particular embodiment of the disclosure shall not be interpreted to limit the scope of the disclosure.

In the following description, certain terminology is used to describe certain features of one or more embodiments. For purposes of the specification, unless otherwise specified, the term "substantially" refers to the complete or nearly complete extent or degree of an action, characteristic, property, state, structure, item, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and "about" generally refer to a deviance of within 5% of the indicated number or range of numbers. In one embodiment, the term "approximately" and "about", may refer to a deviance of between 1-10% from the indicated number or range of numbers.

In the following description, certain terminology is used to describe certain features of the various embodiments of the device, method, and/or system. For example, as used herein, the terms "computer" and "computer system" generally refer to any device that processes information with an integrated circuit chip.

As used herein, the terms "software" and "application" refer to any set of machine-readable instructions on a machine, web interface, and/or computer system" that directs a computer's processor to perform specific steps, processes, or operations disclosed herein.

As used herein, the term "computer-readable medium" refers to any storage medium adapted to store data and/or instructions that are executable by a processor of a computer system. The computer-readable storage medium may be a computer-readable non-transitory storage medium and/or any non-transitory data storage circuitry (e.g., buggers, cache, and queues) within transceivers of transitory signals. The computer-readable storage medium may also be any tangible computer readable medium. In various embodiments, a computer readable storage medium may also be able to store data, which is able to be accessed by the processor of the computer system.

As used herein, the terms "device", "computer", "computer system", "electronic data processing unit", and "server" refer to any device that processes information with an integrated circuit chip, including without limitation, personal computers, mainframe computers, workstations, servers, desktop computers, portable computers, laptop computers, embedded computers, wireless devices including cellular phones, personal digital assistants, tablets, tablet computers, smart phones, portable game players, wearables, smart devices and hand-held computers. The term "internet" refers to any collection of networks that utilizes standard protocols, whether Ethernet, Token ring, Wi-Fi, asynchronous transfer mode (ATM), Fiber Distributed Data Interface (FDDI), code division multiple access (CDMA), global systems for mobile communications (GSM), long term evolution (LTE), or any combination thereof. The term "website" refers to any document written in a mark-up language including, but not limited to, hypertext mark-up language (HTML) or virtual reality modeling language (VRML), dynamic HTML, extended mark-up language (XML), wireless markup language (WML), or any other computer languages related thereto, as well as to any collection of such documents reachable through one specific Internet Protocol Address or at one specific World Wide Web site, or any document obtainable through any particular Uniform Resource Locator (URL). Furthermore, the terms "webpage," "page," "website," or "site" refers to any of the various documents and resources on the World Wide Web, in HTML/XHTML format with hypertext links to enable navigation from one page or section to another, or similar such resources used on the Internet.

As used herein, the terms "sender" or "seller" refer to the valid author or transmitting user of a share, digital asset, file, link, content or resource from their mobile or fixed computing device. The sender configures the asset and its security context factors, as well as chooses the parameters including timing, synchronicity, lifespan, access payment/fee and target recipients as well as the method or mode of transmission.

As used herein, the terms "recipient" or "buyer" refer to the valid peer receiver, consumer, purchaser or engaging user of a sender's share, digital asset, file, link, content or resource on their mobile computing device. The recipient accesses a share on their device from any possible engagement channel and is authenticated and authorized via peer payment to the sender by the present device, system, and/or method according to their local and share global fees and policies set by the sender. The recipient is allowed, denied or misdirected access to the share source content or asset based on passage or failure to authenticate in context, execute the peer payment for the access or any other parameter required or set by the sender. The recipient can, in turn, become their own sender/seller of the same or a new content from their mobile device to other recipients. There may be one or more recipients.

As used herein, the term "factor" refers to any factors, including multi-mass factors, during the main authentication session, including without limitation, personalized authentication context factors or personal factors (e.g., location factors, behavioral factors, custom factors, proximity factors); elements or factors of the session context in the perspective of the server (e.g., host server, link/code object presentation location, user, device, location, any supplied credentials or cloud-stored algorithms about the user behavior, attributes or history); elements of the session context in the perspective of the device (e.g., elements of the website, server, device itself, user, and session); behavioral actions of the user (e.g., facing north, orienting the mobile in portrait mode or executing a gesture, or "exist" within certain location or proximity attributes such as nearness to the server display screen or another device or fixed location point); and external factors such as one or more of an out-of-band personal identification numbers (PIN), passphrase, shared secret data, one-time-password or reused password, delivered via email, short message service (SMS), multimedia service (MMS), voice, physical token, or other human or computer mediated transmission outside of the user channel, host channel, and smart channel.

As used herein, the terms "payment", "peer payment", "peer-to-peer payment", or "P2P payment" refer to any monetary attribute (factor) applied to the share or asset by the sender that requires recipient to successfully remunerate the sender directly, P2P, in that amount or frequency, using a native or 3rd-party mobile payment system or protocol to gain access to the share or asset. Payments are facilitated P2P (recipient to sender) without interim platform ownership of the funds (i.e. not an in-app purchase or store concept). The present device, system, and method only conducts the initial share payment attribute instrumentation, functional facilitation of the P2P payment process between recipient and sender at share engagement and verification of the successful peer payment to authorize recipient share access. Eligible 3rd-party mobile P2P payment systems may include but are not limited to Amazon® Pay, PayPal®, Stripe®, Square®, Venmo®, ApplePay®, SamsungPay®, Visa®, MasterCard®, BitCoin®, Facebook Messenger Payments®, Twitter Payments® or any other functional P2P mobile payment process. Payments may be one-time events, ongoing subscriptions events or periodic events by payment decomposition or recapitulation as determined by the sender or unique security, content or access attributes of the share or asset.

As used herein, the terms "share" or "asset" refer to one or more, or a collection of one or more, encrypted or unencrypted hyperlinks, digital files, documents, images, sound or video files, streams, payments, events, downloads, locations or directions, communication, messages, tweets, posts, emails, short codes, apps or games or game events, knowledge, performance or other electronic manifestation of content capable of being authored, saved, stored, hosted, referenced, downloaded, transmitted and accessed, consumed, opened or otherwise engaged from a computing device according to the steps of the present method.

As used herein, the terms "secured share" or "secured asset" refer to an encrypted or unencrypted asset, file, or hyperlink that offers abstraction and indirection from the original protected source file, link, or asset and is used to transmit from sender to user in lieu of the original asset. The secured share link calls up the system processing when clicked or tapped on a mobile computing device for purposes of allowing or denying access according to the share and user context.

The terms "host" or "platform" refers to any computer network, platform, website or app infrastructure for public or private registration, connection, communication, hosting, sharing, streaming, access or presentation/publication of content, messages, information, data, files, streams, media, documents or computer code by users accessing from either fixed or mobile computing devices. Such "hosts" or "platforms" may include, but are not limited to, popular networks such as Facebook®, Instagram®, Yahoo®, Twitter®, Dropbox®, Box®, Evernote®, Apple® iCloud®, iMessage®, Google Cloud®, Microsoft® OneDrive®, SkyDrive®, Skype®, public email, text messaging, SMS, a web server, an app server, a mobile apps, wearable platforms, local networks and storage, chat or instant messaging.

As used herein, the term "device context" refers to any mobile and/or cloud measurement of the unique identity or presence of the recipients mobile computing device(s), computed a number of ways, or the presence of multiple or alternate devices such as a wearable, timepiece, tablet, desktop computer, media or gaming device, vehicle, building or structure, automation/security, robot, or primary or secondary devices held, operated or provided by another user.

As used herein, the term "location context" refers to any mobile and/or cloud measurement of absolute, range-based or proximal computation of location according to a fixed reference point of the sender, asset, recipient or other fixed and provided location, a location range or tolerance or relative proximity of the recipient(s) or share(s) to a fixed or moving target such as another user, the sender at the time, a device or device(s), geographic points, points of interest, businesses, merchandise, vehicles, or proximity thresholds or tolerances to multiple user locations in synchronous or asynchronous mode.

As used herein, the term "behavior context" refers to any mobile and/or cloud measurement of the recipients voluntary or involuntary behavior, biometrics, touch, motion, gesture, gait, impact, sound, visual or audible focus, stimulus/response, selection, psychological or biological event that can be discerned in context of the share or asset access on a mobile computing device.

As used herein, the term "knowledge context" refers to any mobile and/or cloud measurement of the recipient's knowledge, inference, challenge/response, emotion, selection, choice or expression of information, either stored/shared or self-authenticating, which can be discretely identified and computed in terms of overall cognitive context. Ideally, this takes the form of textual, sonic, visual, touch, motion, gesture, visual/audible, motion, action or inaction responses to stimuli or completely voluntary to express the knowledge for contextual measurement.

As used herein, the terms "temporal context" and/or "time context" refer to any time-based attribute (factor) applied to a share or recipient by the sender that must be adhered to by the recipient for valid authorization or access to the share. Time factors may be absolute or relative to the moment of sharing, transmitting or accessing and may be fixed or adaptive in nature. Time factors may be unary or sequential and may or may not be tied to other factors or contexts such as location, behavior, knowledge, device or payments. Time factors are wholly at the design, discretion and control of the sender and are not authored or governed by the present system and method in terms of any systemic ephemeral qualities.

As used herein, the term "authentication context" refers to a holistic view of all above contexts as a single concept of interdependence, according to share rules, without capabilities, awareness or meaning outside of the others. Devices, location, behavior, time and knowledge, as configured, must be corporately verified without interim challenge-response steps or computation to complete a holistic context for verification. This is what separates it from traditional multifactor or shared-secret approaches.

As used herein, the terms "wearable" or "IOT (internet of things) device" refer to any alternate computing device other than the sender's or receiver's primary mobile computing device. This device may be used as an additional device factor, queried, engaged, interacted with, or merely asserted for presence, identity and status. Alternatively, the wearable or IOT device may be a gateway to provide other user, device or factor information for the purposes of context authentication.

[A] The Sender/Seller Share

On a mobile computing device, the sender ideally selects, captures, copies, or authors one or more instances or collections of an asset, link, stream, or file to share, either locally or remotely via cloud storage, secure and monetize and navigates to select it and/or copies it or its reference into the mobile device clipboard or simply authors it as an audio capture, video capture, image capture or short message including text and other optional links or references to other resources and assets.

Ideally, the sender may tap the device of the present system to choose and configure between zero and "N" (some number of) security factors for the share and recipient authentication requirements with related parameters, from among device, location, behavior, time, and knowledge categories.

Ideally, the primary mobile computing devices of the sender and recipient are configured with a native share access verification factor without any required selection or specification by the sender.

Ideally, if the sender selects devices (as the category of security factors), the sender may choose a generic enforcement of recipient mobile or wearable device authenticity, or alternatively may select a specific alternate device such as, but not limited to, a smart watch, fitness band, or an additional mobile or tablet device. This device must be valid and proximal to the recipient and their primary computing device to access the designated share in context.

Ideally, if the sender selects location, the sender may choose a specific recipient location or a location range, computed and defined as an absolute or proximal value from either the recipient's device at the time of share creation or, alternatively, at the time of share access. Ideally, the actual recipient location parameters as measured by the present system must be valid and within tolerance at the time of share context validation to allow recipient access to the share.

Ideally, if the sender selects behavior, they may choose a pattern of behavior the recipient must perform on their mobile computing or additional wearable or IOT device, as measured by the present system, in order to access the share at time of the authentication. The discrete behavioral pattern is preferably voluntary or involuntary from among a one or more of a touch, motion, gesture, orientation, performance, sound, visual, or other measurable event or events either defined or captured by the present system (server) or mobile device. Alternatively, the sender may generically choose behavior, without knowledge to specifics, thus enforcing the recipient to perform or produce whatever behavioral or biometric requirements exist on the recipient's side of the transaction, device, or account.

Ideally, if the sender selects knowledge, the sender may choose a specific textual secret the recipient must provide at the time of share access, on the recipient's mobile computing device, to access the share successfully. This secret may be mutually known, derived, self-authenticating, delivered out of band, generated as a one-time value, or any other scenario where knowledge secrets can be prompted, captured, and validated by the present system on the recipient mobile device.

Ideally, if the sender selects time, the sender may choose a specific time limit for authorized user share access on their mobile computing device. The access time limit may be defined as a range of time from the moment of share creation or transmission or from the moment of one or more access attempts by one or more recipients. The time limit may be absolute or relative to another element of time, location or access, such as one-time only (1×) or only first person to access (1×, first to engage) or even Nth person to access, as validated by the present system and the recipient mobile device.

Ideally, the sender may select one or any combination of these peer factors (also called security factors) to secure the share, and thus their validation and authentication against the share and recipient at the time of share access attempt will accumulate, comprising the holistic user+share authentication context that must be totally valid for successful recipient share access.

For device context, the sender may tap his/her mobile device to require the recipient or share to be on the particular recipient device that is registered to the recipient in order to access that share, and not an alternate or unknown device.

For location context, the sender may tap his/her mobile device to require the recipient or share to be within an absolute or proximal location at the time of access, as determined by the sender's current or eventual location (at access), a discrete fixed point relative proximity to some other fixed, or moving location, device, or event.

For behavior context, the sender may tap his/her mobile device to require the recipient to perform a certain behavior, touch, gesture, motion, orientation, sound, speech, biometric, pairing, association, or other stimulus-response event on the recipient's mobile device(s) in order to access the share. This may be a known specific behavior or a self-authenticating behavior not known to the sender, but required to exist and be accurate on the recipient's part upon share access per the recipient's device or account rules or configuration.

For knowledge context, the sender may tap his/her mobile device to require the recipient to respond to a prompt or challenge with typed, verbal, or otherwise provided informational responses for comparison or validation. This knowledge may be a shared secret value, an out-of-band value, a one-time-generated value, or a self-authenticating value that is known only to the valid recipient user but required by the sender to be present and accurate or verified for share access.

The sender may optionally choose none, one, many, or all of these security factor types in the context of a share, which shall be accumulated for overall context verification on the part of the recipient and their mobile device at share access time. If no factors are chosen, the present system, by default, will validate the recipient user is accessing the share on the recipient's valid and registered primary mobile device.

Ideally, the sender optionally chooses from the present system the share timing or lifespan, max share access count, share notification subscription, and/or other parameters. Share timing or line space determines the time duration that a share is accessible, regardless of parameter authentication by anyone, and may be a fixed or relative timescale triggered by share creation, time passage, or the occurrence of specific events. Max share access count may determine the maximum times a share may be accessed by one or more recipients, ranging from never to infinite. Share notification subscription setting allows the sender to request to subscribe to notifications from the present system about share access attempts, identity of recipient, location of attempts, and overall status.

In some embodiments the sender may configure a peer-to-peer (P2P) payment mechanism to support the sending and receiving of peer funds for content that is shared, monetized, and/or consumed. The payment mechanism may be a native or 3rd party system capable of both sending and receiving payments to and from senders and recipients in service of monetizing the shared and secured digital content.

Ideally, the sender may optimally choose a payment factor amount for the active share, such as $1.00 (one-dollar), $0.50 (fifty-cents), or $0.01 (one cent), as a one-time or recurring (subscription) value. The share may now be tagged with this attribute within the context of the other security factors, which must all be holistically met by the recipient at engagement time (pass authentication, make payment) to achieve full access to the shared content. The payment factor is ideally composed of the share identifier, the required payment amount value and currency, min/max payment frequency and/or duration, the sender identity and payment receipt mechanisms URL/API for peer remittance and any other payment attributes required or automatically generated by the system for payment facilitation, integrity and security.

In one embodiment the sender optionally chooses a restricted user or user group target for the share transmission.

The composite share parameters, including source asset metadata and security, payment, and user parameters, along with the source shared digital asset or assets are sent from the sender's mobile computing device to the server for processing, transformation and registration of the share.

The server constructs a new secured and obfuscated share based on these and the sender's native parameters to take place of original content, stores the original parameters on the server and returns the new, abstracted, protected share link to the sender's device. This protected link replaces the original share value in the sender's clipboard and provides a new link value sharing by the sender from their clipboard or present system interface.

In one embodiment, the sender optionally copies the new secured share content back into the original sharing app or simply shares the new link directly from this step to the preferred method of transmission to recipient(s). Methods of re-sharing may ideally range from social network posts and direct messages to email, text messages, HTML hyperlinks, posts, or interactive chats.

The sender sends the new secured share content out to one or more peers directly from his or her mobile device, preferably as a social network post, text message, email, HTML link, chat session, or any electronic means.

Optionally, the asset is a file or stored-value message of a certain char length that is encoded/encrypted according to the chosen security context and is sent, retrieved, and unencoded/unencrypted in the cloud and recipient mobile device, by value, based on recipient authentication status, as opposed to merely shown/hidden by reference. If this option is selected, the sender may optionally navigate on his/her mobile device to select the asset, such as a stored or taken photo, email attachment, cloud storage file or asset, or other accessible resource. Once selected, the factors and options are selected as per the method described herein, but the asset is ideally physically modified, encrypted, or encoded based on those parameters, and is either attached for share/transmission to the selected medium or written back to the local or cloud accessible storage to be shared again by reference, but now pointing to the modified and secured source asset.

As with the above flow for shares by reference, if selected, an alternate "ruse" asset would likewise be substituted by value, upon failed share access attempt, in keeping with the original by-value method.

Optionally, the sender may have one or more recipient targets who must mutually and or synchronously authenticate according to their individual or corporate context authenticate rules as set by the sender, for any or all to access the share/asset.

[B] The Recipient Access, Authentication and Payment

Ideally the recipient user accesses the secured share link, synchronously or asynchronously from the sender share event, from the recipient's mobile computing device. Upon share engagement, the recipient is provided an optional preview of the shared and protected or monetized content. If acceptable and desired, the recipient proceeds with a tap of recipient's mobile device, and the mobile device consumes the share reference and the present system sends both the share link and the recipient user credentials to the server, where they are referenced and processed according to the stored rules for both.

If the secured share link is invalid or nonexistent, no further server processing occurs, the recipient simply fails to access the original value and the recipient's mobile device may be notified. The session ends. As detailed above, sometimes the sender's mobile device may be notified as well.

If the share is valid but disabled or passed its access time limit (if set), no further server processing occurs, the recipient fails to access the original value and the recipient's mobile device may be notified. The session ends. As detailed above, sometimes the sender's mobile device may be notified as well.

If the share is valid but configured to require synchronous or mutual authentication by several recipients to unlock the common share asset, the share attempt will remain pending until the mutual or synchronous conditions are met. Optionally, the recipients may leave the present system and may be notified to re-engage when the balance of joint recipients are present or are ready to engage. Optionally, the present system would re-poll the recipients at intervals to attempt to assemble them in real-time for mutual access.

If the share is valid, active, and all other conditions are met, the server may process both the share and user authentication requirements by referencing them from the identifiers provided at share access time. The server may return the authentication rigor algorithm to the present software system on the recipient's mobile computing device.

The server and the present application software system on the recipient's mobile device may both simultaneously compute the authentication context for both the specific recipient and that specific share as one concept, according to the six categories of factors: devices; location; behavior; time; knowledge; and payment, and attempting to compare and resonate the results. If the authentication context factors require the recipient or ancillary devices to perform or give responses to prompts or behavioral, locational, or knowledge-based interrogation, the present software system on the recipient's mobile computing device may perform these functions at this time.

If the secured share is configured for a payment factor, the recipient may be prompted to authorize that specific payment to the sender, either anonymously or identifiably, through their physical or mental acceptance and authorization of the payment. The server may facilitate that specific payment, also called the peer payment, either natively or via 3rd-party P2P payment system, between sender and recipient for the amount specified, and adds the validation of the successful payment token to the access session context.

If the secured share is part of a reoccurring payment between peers, the server may verify the active and acceptable status of the peer payments for this asset or sender/recipient context and add validation of the status token to the overall access session context.

The server, from its own independent position and perspective, may perform the same interrogation against the factors and contexts, such as location, behavior or knowledge detection, proximal device interrogation, time passage, or payment consummation. If the recipient or the recipient's device(s) fail to respond, the session may be ended and the share is protected and not shared.

If the recipient and share context is mutually authenticated and/or monetized by both the server and the present system software on recipient's device, the server preferably computes this and returns to recipient's mobile device the original, unsecured asset link for permitted recipient access.

If either the recipient or the share context fails any authentication or peer payment for any reason, the entire access session fails. The server then denies access to the original share and no further server processing occurs. The server informs the recipient (and/or sender) of the failure, and the sender and his/her original content are protected and not shared.

Preferably, the sender knows the recipient is the valid user, can perform the required authentication context, and has control over the asset shared with that recipient, now and in the future. Additionally, invalid recipients cannot access the shared content, despite perhaps having control over the recipients device, account or having forwarded or copied the protected share content.

[C] Optional Sender/Seller Notification & Control

Regarding recipient access success or failure, the sender may be notified on the sender's mobile device of the recipient access attempt, validation, and payment status. In this case, the sender is able to first authenticate that the recipient is the right user on the right device with the right location, behavior, time, knowledge, and payment.

Optionally, the recipient's mobile device may offer the recipient a real-time decision regarding recipient access with the ability to allow or deny one time or eternal access to the already transmitted share. Optionally, sender may also, in real-time, raise or lower security share requirements or payment price against existing shares, offering through the server an immediate update for all access attempts for that share and/or that recipient user.

Optionally, the sender may be notified of additional, unauthorized share attempts (in the case of a copy/forward or recipient account takeover) and simply rescind all access to the share at issue indefinitely.

Optionally, the sender may refuse a peer payment from any recipient for any reason, in real-time, thus cancelling the share access session and protecting the shared, secured, and monetized content.

[D] Optional Recipient Remote/Local Storage and Re-Access

Upon successful access of the secured and/or monetized file via the original secured link, the recipient may optionally store the secured target asset (the share) on recipient's local mobile device or in a cloud-storage environment for future access. All attempts to re-access the file either locally or remotely in this manner may be set up to be subject to initial sender and server verification protocols such as authentication, payment, or subscription status.

Optionally, the share, digital file, or asset may be a cloud-stored file that is accessed by the recipient via the initial, secured link. Upon recipient attempting to re-access of the same file or asset without being resent by the sender, the server may again authenticate and verify recipient authorization to access the asset. All original validations of authenticity and payment (or subscription) may be re-verified before access is granted. Optionally, sender notification and approval, if configured, may also apply in this situation.

Optionally, the share, digital file, or asset may be a locally stored file on the recipient's mobile device that is accessed by the recipient via the internal navigation, selection, or engagement. Upon attempted re-access of the locally secured file or asset by the recipient on the recipient's local mobile device, the server may again authenticate and verify recipient authorization to access the asset. All original validations of authenticity and payment (or subscription) may be re-verified before access is granted. Optional sender notification and approval, if configured, may also apply in this situation. Re-access may not be possible without the recipient's mobile device being connected to the server.

Embodiments

One embodiment may be a sender wanting to simply, easily, and safely author or select, secure, share, control, and monetize digital content in a peer-to-peer (P2P), one-to-one, or one-to many way, with one or more mobile recipient users across a native, public, private, social, or messaging network, such as Facebook®, Twitter®, email, text messaging, blog, website, or chat platform such as Skype® or Messenger®. The digital content eligible for sharing, securitization, and monetization between or among peers may include any digital file, including, but not limited to music, movies, images, ebooks, files, documents, and code, or may be information such as status updates, instructional information, site reviews, links to public articles and content, interactive day-to-day chatting, jokes, product recommendations, introductions, and the like. The share or asset may also include credit card numbers, passwords, access codes, API keys, private photos, discrete location map links, employee/employer documents, resumes/applications, medical records, parent/child communication, adult content, copyrighted material, and time or value-sensitive materials.

One embodiment may involve the sender either authoring, navigating and selecting (either by value locally or by reference hosted in cloud storage as a link), or copying into memory, one or more specific digital content to share by using the sender's mobile device. The specific digital content, in one embodiment, may be a music file or album of music files. The author/sender may then select security requirements such as a password, in order to ensure the intended recipient is authentic at time of consumption (accessing the share). The sender may also select a payment factor, in a specific currency amount, for the recipient to pay the sender, thus purchasing the content, peer to peer. The sender may save the share in the present system (on the server) and the sender is returned a new sharable link that references but obfuscates the original source content of the share and requires fulfillment of security and monetization attributes by the recipient in order for the recipient to access the share. The sender then shares the newly secured link into, for example, Facebook® for dissemination to one or more recipients. Synchronously or asynchronously, the recipients get a Facebook® message on their mobile device (such as an Android® based smartphone), tap (select) the secured share and then perform the required security tasks and/or remit the peer payment to the sender (if required). The present system may authenticate the recipient according to the security requirements, validates successful payment remission, and then transmits the now accessible music file to the verified recipient for consumption, playback, saving, and/or enjoyment. The sender may be optionally notified that the recipient consumed, accessed, and/or purchased the share. Facebook® had neither temporary nor long-term control and/or storage of the music file (the share), yet the platform (in this example Facebook®) was easily and openly used as the transmission medium between two users. This embodiment may use any of the factors, parameters, currencies, or peer payment mechanisms facilitated by the present system (and detailed herein), across the same or different devices, networks or platforms, and required notification with real-time permission option instead of mere notification. As a result, the secured digital content was shared, consumed, and/or monetized over public networks between peers with complete authenticity, immediacy, and control, all with just a few taps on the mobile device (and the meeting of the security requirements.

Another embodiment may involve a sender wishing to monetize a file, link, or reference to a video stream or content over social media or public messaging. The sender either authors, captures, or navigates and selects a video file or stream into memory (by value or reference). The sender then selects the security requirements, such as, for example, a geofence, in order to ensure that the intended recipient is authentic at time of consumption. The sender may also select a payment factor, in a specific currency amount, for the recipient to pay the sender, in order to purchase the content, peer to peer. The sender saves the share to the server and is returned a new sharable link that references but obfuscates the original source content, and requires fulfillment of the security factors and payment (if required) by the recipient in order to access the share/asset. The sender then shares the newly secured link into, for example Twitter®, for dissemination to one or more recipients. Synchronously or asynchronously, the recipients receive the Twitter® message on their mobile devices, for example an iOS Apple® device, and then tap the secured share link, and then perform the required security tasks and/or remit the peer payment (if required) to the sender. The present system (typically, the server) authenticates the recipient (if the security tasks are performed/entered correctly) and/or validates the payment success, and then transmits the now accessible video file or stream to the verified recipient for consumption, playback, saving, and/or enjoyment, on the recipient's mobile device. The sender is optionally notified that the recipient consumed or purchased the share.

Another embodiment may involve the present system sharing, protecting, and monetizing content shared over text messages between two user's phones, using the phones' public data accounts. In this case, the sender may wish to share a monetized image over a text message. The sender selects, navigates, and/or pastes into the present system (the server) the photo in question, selects a payment amount that is required, receives the secured asset, and pastes back from the clipboard the secured asset via text message to the phone number of the intended recipient. The recipient gets the text message in near real-time and clicks on it, the present system authenticates the share, recipient, and/or device, and then prompts the recipient to pay the required amount to the sender, peer to peer, via, for example, a 3rd-party peer payment mechanism. In this case only payment is required, no security tasks are required. The recipient taps recipient's mobile device to authorize payment, and, upon verification, the server (the present system) enables the photo to be viewed (and/or stored) by the recipient.

Another embodiment may involve sharing over a real-time chat. The sender wants to say something private over, for example, a Skype® chat, but the sender wants the recipient to pay for that specific information to be shared. The sender authors a quick message in the present system, selects a payment amount for that content, and sends it to the server, which returns the secured and monetized share. The sender chooses the recipient in the Skype® chat window and pastes the newly created secured and monetized share into the original Skype® chat window. The recipient taps (or otherwise selects) the share, which may be instantly validated by the present system if the recipient is using the expected (and correct device). The recipient is prompted to authorize payment to the sender. Upon doing so (via a native or $3^{rd}$ party payment system), the share content is revealed by the present system on the recipient's device and the thoughts/information of the sender are securely and privately communicated without any content being saved to the logs or the Skype® servers.

Another embodiment may involve monetizing content behind a cloud storage file (document, PDF, excel spreadsheet, zip file, code bundle, etc.) link on Dropbox®, where the sender wants to exercise location, payment, and real-time permission control over the share. The sender a) navigates in Dropbox®, b) selects a file link in the clipboard, c) chooses security and payment parameters (factors), and d) taps (or other selects) notification control. The server returns to the sender the secured link. The sender then simply pastes the clipboarded secured link(s) into an email, for example, and sends the file to, for example, three (3) colleagues. Two colleague recipients pick up the email, tap/access the link, submit a peer pay, and then open the Dropbox® share. The security has required the two colleagues to be on a specific device and at a specific and immediate location, which is why the present system authenticated them automatically and made the share/link available. However, the third colleague recipient is out of range (and/or is using an unknown/wrong device) and upon attempt to access is prevented from paying for or consuming the share on the Dropbox® platform. The sender may be notified of this failure and where the colleague was located at the time of the failure and/or where the colleague is located immediately. If the sender is satisfied with the current location of the third colleague, the sender may tap/select "permit" to allow the third colleague to access the share, even though that recipient is not within a prescribed range or location. The third recipient may now pay and access the file per the sender's discretion.

Another embodiment may involve the popular desire to "pull back" content after it has been sent and consumed/received by a recipient. The sender may compose or select content, send it to the server of the present system, select a notification to enable permission (and/or payment) as the authentication factors, receive the secured asset back from the server, and then share, in email, for example, to a recipient list. However, upon later inspection, the sender may realize that he/she shared to the entire social network, not just to the sender's friends. Because the sender chose notification, he or she simply waits for the first person to try to access, is notified, and then immediately denies and deletes the share completely. Now each email is effectively retrieved with no trace in the inbox, email servers or routers. The sender can simply re-share with proper parameters to the proper recipients or forget the whole affair.

Another embodiment may involve a periodic subscription payment conducted between peer end users to authorize continued access to a file or other shared digital content. In this embodiment, the peer seller may share a file or link with a recipient over social media, messaging or direct transmission. This file or link has been tagged by the sender for certain authentication and payment context characteristics. Among them are timing (accessible for certain time) and payment as a periodic element of, for example, $1.00 per month. Upon engagement of the shared file, the recipient meets the contextual requirements (authentication) and conducts the peer payment for $1.00—authorizing a monthly draw of $1.00 in perpetuity for access to the content. As the recipient re-accesses the content over time, the currency of payment status is verified along with the time or any updated authentication parameters set or re-set by the sender. If the validation passes all requirements, local or network access to the file(s) or link(s) is permitted. If validation fails any requirement, such as a missed or terminated payment, the file is protected from recipient access (recipient is denied access). The sender is optionally notified and is able to re-enable access or modify the settings as desired or as needed.

Another embodiment may involve the sender authoring, navigating and selecting (either by value locally or by reference hosted in cloud storage as a link), or copying into memory a specific digital content to share from the sender's mobile device. In this case a music file or album of music files. The author, using the present system and method, may then select security requirements such as a password, to ensure that the intended recipient is authenticated at time of consumption of the digital content share. The sender may also select a payment factor in a specific currency amount for the recipient to pay the sender in order for the recipient to purchase the content, peer to peer. The sender saves the share in the server (of the present system) and is returned a new sharable link that references but obfuscates the original source content and requires fulfillment by the recipient of the security and monetization attributes (selected by the sender) for access. The sender then shares the newly secured link into, for example Facebook® for dissemination to one or more recipients. Synchronously or asynchronously, the recipients receive the Facebook® message on their devices, for example, a smartphone running the Android® software, tap/select the secured share link, perform the required security tasks, and/or remit the peer payment to the sender. The present system (via the server and/or recipient device) may authenticate the recipient according to the security requirements, validates the payment success, and transmits the now accessible music file to the verified and paid recipient for consumption, playback, storage, and/or enjoyment. The sender may be optionally notified that the recipient consumed or purchased the share. The recipient optionally stores the secured access and/or purchased digital asset in either their local, mobile device or in a cloud storage environment. Later, the recipient may re-access the music file to playback again. This may trigger the initial security and payment checks (whether locally or remotely accessed) to be performed to gain access to the file. This may or may not require additional payment, depending on what the sender set up in the present system. If passed and permitted, the recipient may again download, stream, or locally play back the music. If denied, the recipient is not permitted access to the music file again, regardless of its storage location. Optionally, the sender may be notified of each recipient local access attempt, just as they might be in the initial sharing and access attempt. This notification may allow the sender to provide (additional) real-time permissions, controls, or modifications to the music playback authorization. This scenario may also apply to any digital asset stored or accessed in this manner, such as a file, stream, document, image, video, text, link or data.

The term tap may mean engaging with a touch screen of a mobile device or touch display, or using a mouse or a keyboard to select and open a file or link on any electronic computing device. FIG. 1 is a system diagram of one embodiment of the computer-based method and system for securing and/or monetizing peer-to-peer digital content. As shown in FIG. 1, the sharing and monetizing system 100 may comprise a server 120, a sender device 110, and a recipient device 145. FIG. 1 is an illustration of one embodiment of the system for mobile peer authentication and asset control and shows the primary components and general flow of the system, which includes the sender 105 securing and monetizing from their mobile computing device 110, the share, the recipient 140 from accessing from their mobile computing device 145. As shown in FIG. 1, one embodiment of the system 100 may comprise: a share 115, which may be any type of asset, but is shown as a music file in FIG. 1, a secured share link 125, and one or more servers 120. FIG. 1 shows that the sender 105 preferably selects, copies, or authors an asset or share 115 to protect or monetize. The sender 105 may also configure the share 115 for protection using various authentication factors (e.g., device, location, behavior, knowledge, time, etc.) and optional peer monetization factors (price to view/access/download) via the server 120, which returns a secured share link 125 or file to be shared over any electronic transmission 155 (e.g., digital social, messaging, mobile, web, storage communication channels) with one or more recipients 140 on the recipient's mobile device 145. The recipient(s) 140 may tap or engage with the secured share wherever the recipient(s) 140 encounters the electronic transmission 155 sending secured link 130, and upon doing so, must perform an authentication 190 (or authentication tasks) and/or remediate peer payment 150 to the sender 105 in order to gain access to the share 115. The server 120 preferably validates the authentication 190 (if completed correctly by the recipient 140) and payment 150, and upon successful validation, authorization, and optional sender 105 permissions (in the event of notification being set up), the server 120 returns or optionally decrypts the original source asset 115 for the valid recipient 140 to consume or engage as share 135. Subsequent attempts by the valid intended recipient 140 are generally met with the same validation or monetization rigor through the servers 120, regardless of secured asset context, transmission or location (local or remote).

Figure 2:
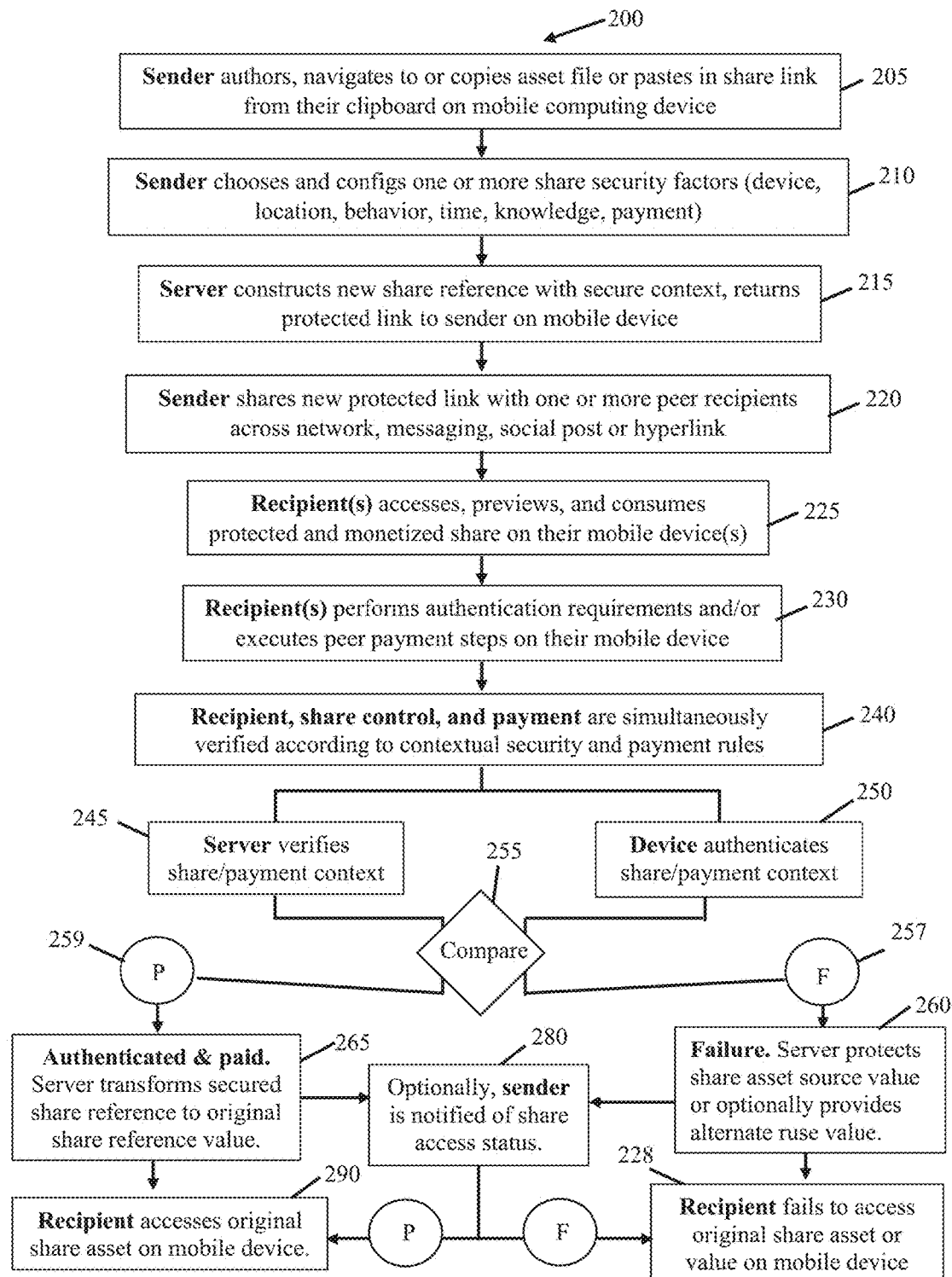
FIG. 2 is a flow chart of one embodiment of the computer-based method for securing and/or monetizing peer-to-peer digital content.

FIG. 2 is a flow chart of one embodiment of the computer-based method for securing and/or monetizing peer-to-peer digital content. FIG. 2 shows one embodiment of method 200 of the system 100 shown in FIG. 1, which may comprise the steps: 205 sender authors, navigates to, or copies asset file or pastes in share link from sender's clipboard on mobile computing device 110; 210 sender chooses and configures one or more share security factors (device, location, behavior, time, knowledge, payment); 215 server 120 constructs new share reference with secure context, returns protected link 125 to sender 105 on mobile device 110; 220 sender 105 shares new protected link 130 with one or more peer recipients 140 across network, messaging, social post, or hyperlink 155; 225 recipients 140 accesses and previews the secure link 130 on mobile device 145; 230 recipients 140 perform authentication tasks 190 and/or tender peer payment 150 via/with mobile device 145; 240, preferably, recipient, share control, and payment are simultaneously verified according to contextual security and payment rules (in the server 120); 245 server 120 verifies correct payment/authentication and/or 250 device 145 authenticates share/payment context; 255 server 120 compares the contexts and either passes 259 or fails 257; 265 if passed and authenticated and paid the server 120 transforms the secured share reference 130 to the original share reference value 135 which 290 recipient may access on device 145; optionally, 280, the sender 105 may be notified of share access status and my elect to pass or fail access; 260 failure allows the server 120 to protect the share asset 115, 135 and/or optionally provide a ruse asset/value; 280 unless the sender overrides the failure 260, the recipient fails to access the original share asset or value on mobile device 145.

Figure 3:
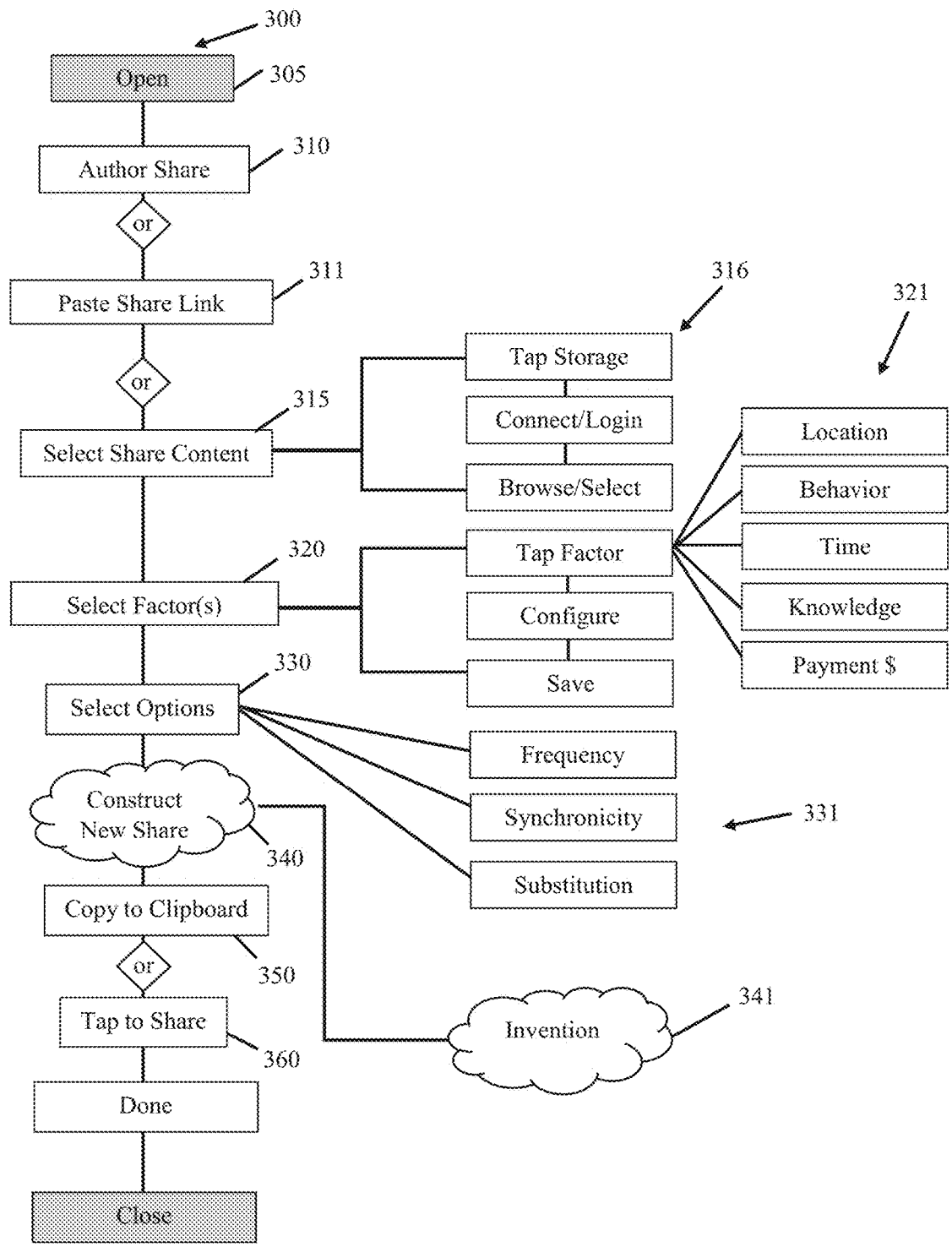
FIG. 3 is a block diagram of one embodiment of the computer-based method for securing and/or monetizing peer-to-peer digital content.

FIG. 3 is a block diagram of one embodiment of the computer-based method for securing and/or monetizing peer-to-peer digital content. As shown in FIG. 3, the system 300 opens 305 with the author share 310 or pasted link 311 or selection of share content 315. The share is selected via an action 316 and the user then selects 320 and configures authentication factors 321. The sender 105 may select other options 330, including, but not limited to frequency, synchronicity, and substitution 331. The share is converted by the server/software 341 into a secured share 340. The new share is copied to the clipboard 350 or otherwise shared 360.

Figure 4:
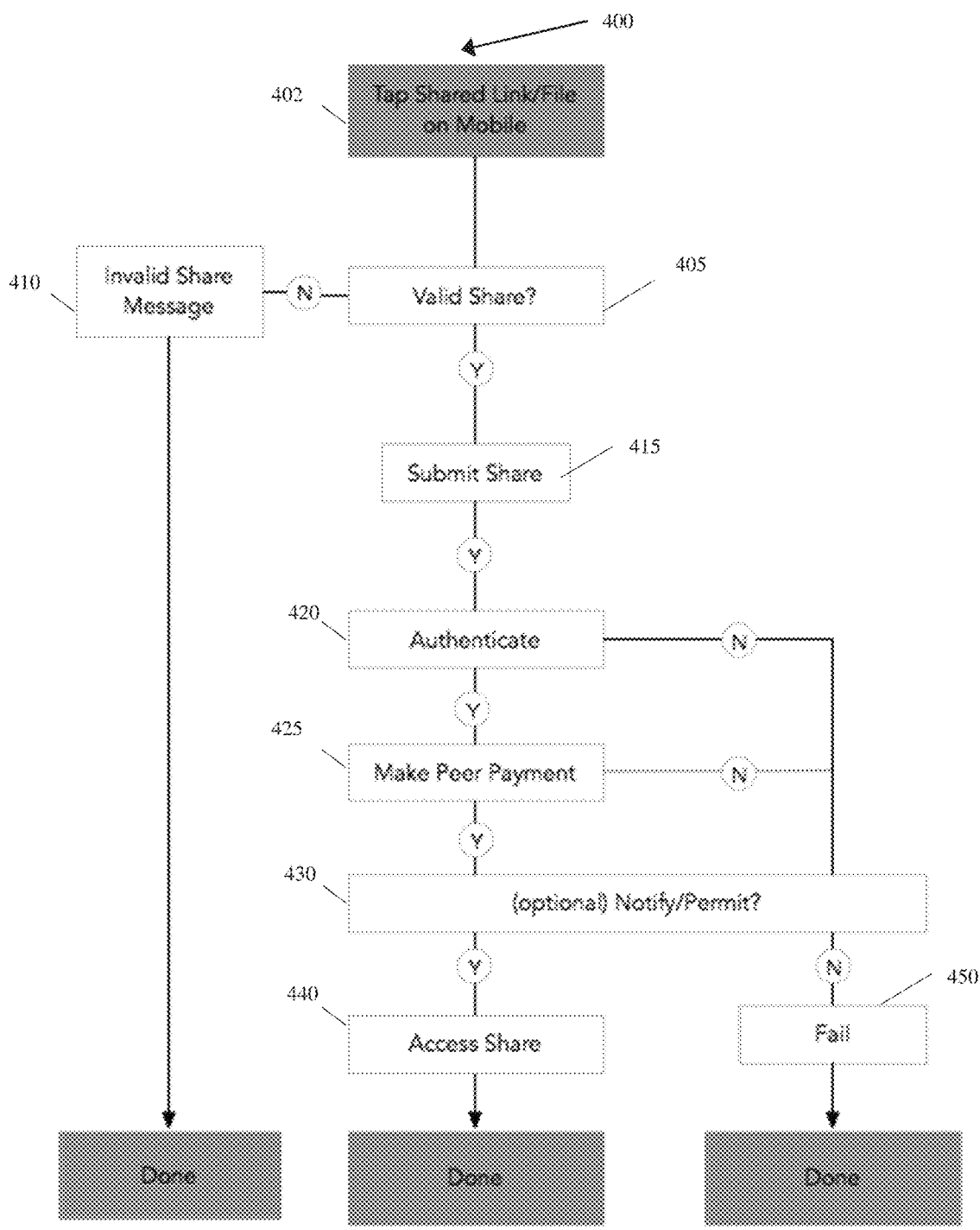
FIG. 4 is a flow chart of one embodiment of the computer-based method for securing and/or monetizing peer-to-peer digital content.

FIG. 4 is a flow chart of one embodiment of the computer-based method for securing and/or monetizing peer-to-peer digital content. FIG. 4 shows the recipient side of the system 400. The recipient 140 may tap or otherwise access the link file on recipient's device 145. Although mobile devices 110 and 145 are shown, the device may be any electronic data processing unit or computer. 405 the system 400 may reject 410 any invalid shares. If the share is valid it may be submitted 415 to the recipient 140 for authentication 420. If authenticated, the recipient may have to make a payment 425. If paid and authenticated, the sender 105 may be notified 430. If all authentication, optional parameters, factors, and payment are successful, then the server may provide access to the share 440. Any failure may result in a fail 450.

Figure 5:
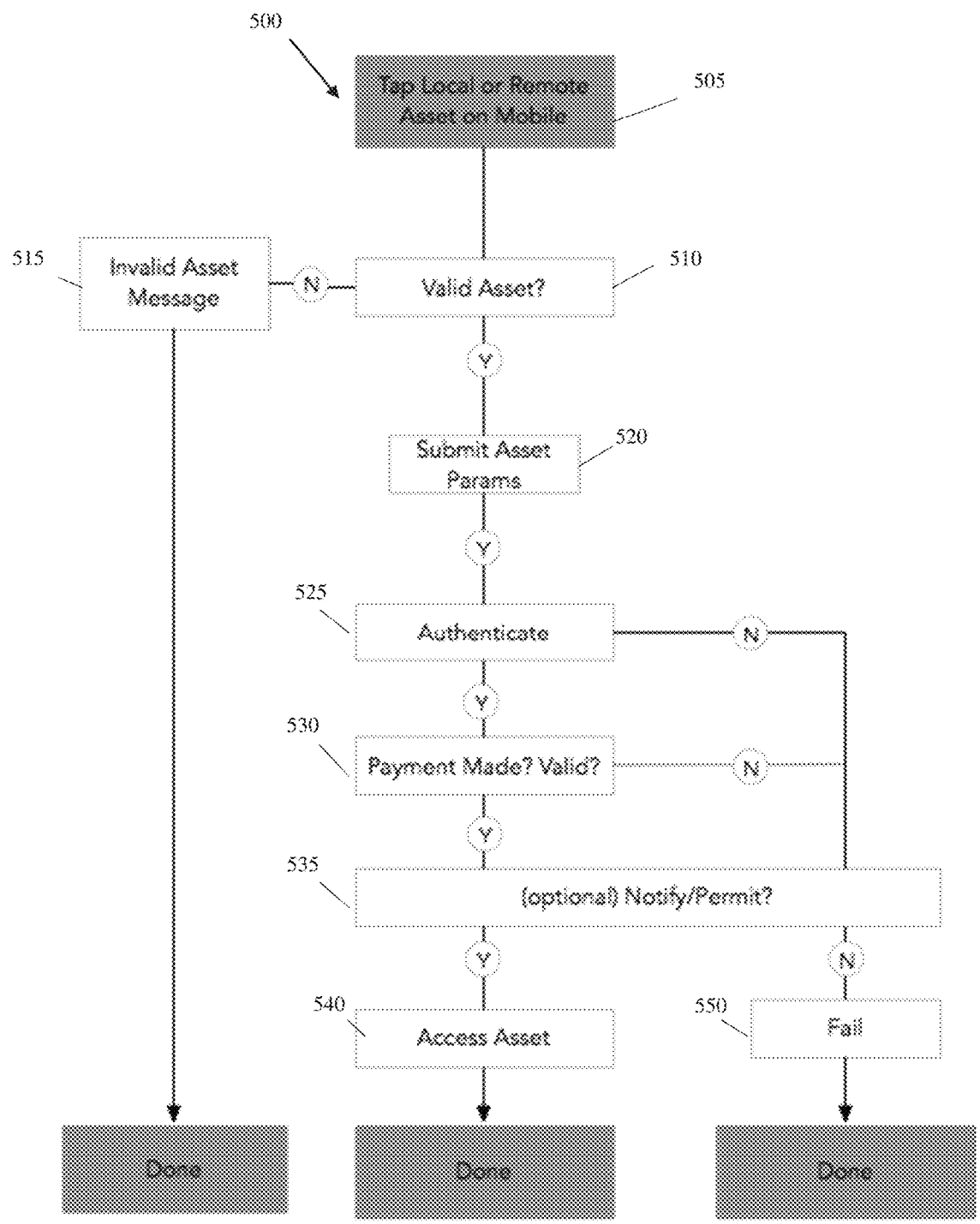
FIG. 5 is a flow chart of one embodiment of the computer-based method for securing and/or monetizing peer-to-peer digital content.

FIG. 5 is a flow chart of one embodiment of the computer-based method for securing and/or monetizing peer-to-peer digital content. FIG. 5 shows the same basic recipient system 500 that is shown in system 400 in FIG. 4. FIG. 5 shows the system 500 for accessing an asset 505 (local or cloud) on a mobile device 145. FIG. 5 shows steps 510, 515, 520, 525, 530, 535, 540, and 550 to determine if an asset is allowed to be accessed by one or more recipients.

Unless otherwise stated, all measurements, values, ratings, positions, magnitudes, sizes, locations, and other specifications that are set forth in this specification, including in the claims that follow, are approximate, not exact. They are intended to have a reasonable range that is consistent with the functions to which they relate and with what is customary in the art to which they pertain.

The foregoing description of the preferred embodiment has been presented for the purposes of illustration and description. While multiple embodiments are disclosed, still other embodiments will become apparent to those skilled in the art from the above detailed description. These embodiments are capable of modifications in various obvious aspects, all without departing from the spirit and scope of protection. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope of protection. It is intended that the scope of protection not be limited by this detailed description, but by the claims and the equivalents to the claims that are appended hereto.

Except as stated immediately above, nothing that has been stated or illustrated is intended or should be interpreted to cause a dedication of any component, step, feature, object, benefit, advantage, or equivalent, to the public, regardless of whether it is or is not recited in the claims.

What is claimed are:

1. A network and platform independent computer based method for securing and monetizing peer-to-peer digital content, comprising the steps:
    providing a server, said server comprises a server securitization and monetization application;
    providing a sender device and a recipient device, each of which comprises a device securitization and monetization application that are controlled by and are configured to communicate with said server securitization and monetization application;
    prompting a sender to select a share using said sender device;
    prompting said sender to select one or more authentication factors to associate with said share;
    prompting said sender to configure at least one recipient peer payment factor associated with such share, wherein said at least one recipient peer payment factor comprises at least one valid peer electronic payment from at least one recipient thereof to said sender in accordance with at least one of payment amount, a currency, a frequency, and combinations thereof as specified by the sender;
    creating a secured share, said secured share references but obfuscates said share and requires fulfillment of said one or more authentication factors and said at least one recipient peer payment factor in order for at least one recipient to access said share;
    returning said secured share to said sender device;
    sending said secured share to said at least one recipient;
    prompting said at least one recipient to preview said secure share on said recipient device;
    processing said at least one recipient's attempt to fulfill said one or more authentication factors;
    processing said at least one recipient's attempt to fulfill said at least one recipient peer payment factor;
    determining by said server whether said one or more authentication factors and said at least one recipient peer payment factor were successfully fulfilled by said at least one recipient;
    providing access to said share to said recipient device for consumption by said at least one recipient if said one or more authentication factors and said at least one recipient peer payment factor were successfully fulfilled by said at least one recipient; and
    denying access to said share if said one or more authentication factors were not successfully fulfilled or if said at least one recipient peer payment factor was not fulfilled.

2. The computer based method for securing and monetizing peer-to-peer digital content of claim 1, wherein at least one of said one or more authentication factors are selected from the group of authentication factor categories consisting of: location; behavior; time; knowledge; and device type.

3. The computer based method for securing and monetizing peer-to-peer digital content of claim 1, wherein said at least one recipient peer payment factor is a reoccurring payment.

4. The computer based method for securing and monetizing peer-to-peer digital content of claim 1, further comprising the steps:
    prompting said sender to select one or more options to associate with said share.

5. The computer based method for securing and monetizing peer-to-peer digital content of claim 4, wherein said at least one recipient is two or more recipients;

wherein at least one of said one or more options selected is synchronicity, such that said two or more recipients must attempt to fulfill said one or more authentication factors in synch.

6. The computer based method for securing and monetizing peer-to-peer digital content of claim 1, further comprising the steps:
wherein at least one of said one or more options selected is a notification;
notifying said sender by said server whether said one or more authentication factors and said at least one recipient peer payment factor were successfully fulfilled by said at least one recipient.

7. The computer based method for securing and monetizing peer-to-peer digital content of claim 6, further comprising the steps:
wherein said notification is before access is provided or denied.

8. The computer based method for securing and monetizing peer-to-peer digital content of claim 7, further comprising the steps:
processing by said server whether said notified sender overrides either successful fulfillment or unsuccessful fulfillment of said one or more authentication factors and said at least one recipient peer payment factor.

9. The computer based method for securing and monetizing peer-to-peer digital content of claim 1, further comprising the steps:
wherein said secured share is sent via one or more third party networks;
wherein if said one or more authentication factors and said at least one recipient peer payment factor were successfully fulfilled, said share never resides on one or more servers of said one or more third party networks.

10. The computer based method for securing and monetizing peer-to-peer digital content of claim 1, wherein if access is denied by said server, said server provides a ruse share to said unsuccessful recipient.

11. The computer based method for securing and monetizing peer-to-peer digital content of claim 10, wherein said ruse share is sent instead of a denied message.

* * * * *